US012803115B2

(12) United States Patent
Lu et al.

(10) Patent No.: US 12,803,115 B2
(45) Date of Patent: Nov. 17, 2026

(54) BATTERY, BATTERY MODULE, BATTERY PACK AND ELECTRIC VEHICLE

(71) Applicant: BYD COMPANY LIMITED, Shenzhen (CN)

(72) Inventors: Kewei Lu, Shenzhen (CN); Xiaowen Mu, Shenzhen (CN); Yanchu Liu, Shenzhen (CN); Jingyan Zhu, Shenzhen (CN); Xuan Yu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 703 days.

(21) Appl. No.: 17/778,710

(22) PCT Filed: Oct. 27, 2020

(86) PCT No.: PCT/CN2020/124107
§ 371 (c)(1),
(2) Date: May 20, 2022

(87) PCT Pub. No.: WO2021/098455
PCT Pub. Date: May 27, 2021

(65) Prior Publication Data

US 2023/0020749 A1 Jan. 19, 2023

(30) Foreign Application Priority Data

Nov. 22, 2019 (CN) ......................... 201911159598.8

(51) Int. Cl.
*H01M 50/46* (2021.01)
*H01M 10/48* (2006.01)
(Continued)

(52) U.S. Cl.
CPC ......... *H01M 50/46* (2021.01); *H01M 10/482* (2013.01); *H01M 50/209* (2021.01); *H01M 50/51* (2021.01); *H01M 2220/20* (2013.01)

(58) Field of Classification Search
None
See application file for complete search history.

(56) References Cited

U.S. PATENT DOCUMENTS

2004/0170887 A1* 9/2004 Masumoto .......... H01M 50/593 429/185
2008/0280200 A1* 11/2008 Takahashi ........... H01M 50/103 429/186

(Continued)

FOREIGN PATENT DOCUMENTS

CN 101141010 A 3/2008
CN 102104167 A 6/2011

(Continued)

OTHER PUBLICATIONS

Machine english translation of CN209389151 (Year: 2019).*

(Continued)

*Primary Examiner* — Jeffrey T Barton
*Assistant Examiner* — Karen J. Armstrong
(74) *Attorney, Agent, or Firm* — Sheppard Mullin Richter & Hampton LLP

(57) ABSTRACT

Disclosed are a battery, a battery module, a battery pack, and an electric vehicle. The battery includes a housing and at least two electrode core sets. The housing has an accommodating cavity therein. The at least two electrode core sets are arranged in the accommodating cavity and connected in series with each other. Each electrode core set includes at least one electrode core (4). The battery further includes separators. The separators each are arranged between two adjacent electrode core sets. The separator includes a first separator (13) and a second separator (14). A gap is provided (Continued)

between the first separator (13) and the second separator (14).

19 Claims, 7 Drawing Sheets

(51) Int. Cl.
*H01M 50/209* (2021.01)
*H01M 50/51* (2021.01)

(56) References Cited

U.S. PATENT DOCUMENTS

| | | | | |
|---|---|---|---|---|
| 2014/0234726 | A1* | 8/2014 | Christensen | H01M 10/0525 429/231.95 |
| 2017/0092911 | A1* | 3/2017 | Nishikawa | H01M 50/24 |
| 2018/0102565 | A1 | 4/2018 | Yamamoto | |

FOREIGN PATENT DOCUMENTS

| | | | | |
|---|---|---|---|---|
| CN | 203150621 | U | | 8/2013 |
| CN | 205960045 | U | | 2/2017 |
| CN | 205960130 | U | | 2/2017 |
| CN | 206271794 | U | | 6/2017 |
| CN | 206480683 | U | | 9/2017 |
| CN | 107634172 | B | | 1/2018 |
| CN | 207368044 | U | | 5/2018 |
| CN | 209150238 | U | | 7/2019 |
| CN | 209312827 | U | | 8/2019 |
| CN | 209389151 | U | * | 9/2019 |
| JP | 2013251085 | A | | 12/2013 |
| JP | 2014157722 | A | | 8/2014 |
| JP | 2016081762 | A | | 5/2016 |
| JP | 2017069004 | A | | 4/2017 |
| WO | 2018059143 | A | | 4/2018 |

OTHER PUBLICATIONS

“4 Types of Camber” by Sautya accessed Jan. 29, 2025 https://civilnoteppt.com/4-types-of-camber/ (Year: 2017).*

International Search Report and Written Opinion for Application No. PCT/CN2020/124107, mailed on Feb. 7, 2021, 10 pages.

* cited by examiner

BATTERY, BATTERY MODULE, BATTERY PACK AND ELECTRIC VEHICLE

CROSS-REFERENCE TO RELATED APPLICATIONS

This application is a National Phase Application of International Patent Application No. PCT/CN2020/124107, filed on Oct. 27, 2020, which is based on and claims priority to and benefits of Chinese Patent Application No. 201911159598.8, filed on Nov. 22, 2019 and entitled "BATTERY, BATTERY MODULE, BATTERY PACK AND ELECTRIC VEHICLE". The entire content of all of the above-referenced applications is incorporated herein by reference.

FIELD

The disclosure relates to the technical field of batteries, and more specifically, to a battery, a battery module, a battery pack, and an electric vehicle.

BACKGROUND

Lithium-ion batteries are novel pollution-free recycled batteries, and are widely used in many fields, especially used as a power battery for a new energy automobile. With increasing popularization and gradual performance improvement of the new energy automobile, users impose increasingly high requirements for mileage and dynamic performance of the new energy automobile. Therefore, increasingly high use requirements are imposed on power batteries of the new energy automobile. A battery pack used in the new energy automobiles is required to have an increasingly high overall capacity but a minimized total weight. Generally, the new energy automobile uses a storage battery having a very large capacity, but one cell cannot provide a sufficient capacity. Therefore, multiple cells are usually required to be arranged side by side. Therefore, a total weight of the battery pack is not insignificant. A lightweight design of the battery pack is of great significance for a lightweight design of the new energy automobile.

Currently, although some battery module structures in related arts may be connected in series in combinations, requirements such as lightweight, low costs, and high-energy density of lithium-ion batteries cannot be satisfied due to a large number of structural components that are used.

In view of this, it is necessary to provide a new technical solution, so as to resolve the foregoing problem.

SUMMARY

This disclosure provides a new technical solution including a battery, a battery module, a battery pack, and an electric vehicle.

A first aspect of the disclosure provides a battery, which includes:

- a housing, having an accommodating cavity therein;
- at least two electrode core sets, arranged in the accommodating cavity along a first direction and connected in series with each other, where each electrode core set includes at least one electrode core; and
- separators, arranged between two adjacent electrode core sets, configured to prevent the two adjacent electrode core sets from contacting with each other, and including a first separator and a second separator. The first separator and the second separator are arranged opposite to each other along a second direction. A gap is provided between the first separator and the second separator along the second direction.

The second direction is perpendicular to the first direction.

In an embodiment, the first separator and the second separator are fixedly connected with an inner surface of the housing.

In an embodiment, the first separator and/or the second separator are/is integrally formed with the housing.

In an embodiment, the first separator and the second separator are plate-shaped or mesh-shaped.

In an embodiment, two ends of the electrode core set arranged opposite to each other along the second direction span the gap between the first separator and the second separator.

In an embodiment, an expansion space is reserved between the electrode core set and the separator.

In an embodiment, the first separator and the second separator each include a separator side surface facing the electrode core set. A distance between the separator side surface of the first separator and/or the second separator and the electrode core set shows an increasing trend in a direction from outside to inside of the housing.

In an embodiment, each of the first separator and the second separator includes two separator side surfaces facing the two adjacent electrode core sets. The two separator side surfaces are cambered surfaces.

In an embodiment, each of the at least two electrode core sets includes circumferential surfaces facing the housing and a lateral surface facing the separators. An area of the lateral surface is greater than an area of the circumferential surfaces.

In an embodiment, the separator is made of an insulation material.

In an embodiment, an insulation film is arranged between the at least two electrode core sets and the housing.

In an embodiment, the housing includes a housing body having an end portion with an opening and a cover plate arranged at the opening of the housing body.

In an embodiment, the first separator is integrally formed with the cover plate, and/or the second separator is integrally formed with the housing body.

In an embodiment, grooves are provided on the cover plate. Conductive connection components are embedded in the grooves; and the conductive connection components are configured to connect the two adjacent electrode core sets in series.

In an embodiment, the conductive connection components are integrally formed with the cover plate.

In an embodiment, each of the conductive connection components includes a copper connection piece and an aluminum connection piece. A position where the copper connection piece is electrically connected with the aluminum connection piece is located in the cover plate.

In an embodiment, an insulation layer is arranged between the conductive connection component and the cover plate.

In an embodiment, the battery further includes a detection circuit electrically connected with the at least two electrode core sets and configured to detects a status of the at least two electrode core sets.

In an embodiment, the detection circuit comprises a sampling wire. The sampling wire is connected with the conductive connection component.

In an embodiment, the battery is a polymer lithium-ion battery or a solid-state battery.

A second aspect of the disclosure provides a battery module. The battery module includes the battery described above.

A third aspect of the disclosure provides a battery pack. The battery pack includes the battery described above or the battery module described above.

A fourth aspect of the disclosure provides an electric vehicle. The electric vehicle includes the battery module described above or the battery pack described above.

In the battery provided in the disclosure, the at least two electrode core sets are connected in series in the accommodating cavity of the housing, that is to say, the at least two electrode core sets share the housing. Therefore, in the disclosure, the number of housings and external mounting structures are reduced, thereby reducing a weight of the battery. In addition, the separator is arranged between the two adjacent electrode core sets. The separator can effectively prevent the two adjacent electrode core sets from contacting with each other. Even if the battery is squeezed or collided, by means of the isolation of the separator, the electrode core sets do not collide or contact with each other, thereby ensuring use reliability and safety of the battery. In addition, the separator can further provide support in the housing, so that an ability of the battery to resist external forces is enhanced. In addition, since the separator can include the first separator and the second separator, and the gap is formed between the first separator and the second separator, convenient mounting is achieved. Compared with the arrangement of a single complete separator, the weight of the battery can be effectively reduced, thereby facilitating lightweight design of the battery and reducing costs.

Other features and advantages of the disclosure will become apparent from the following detailed description of embodiments of the disclosure with reference to the drawings.

BRIEF DESCRIPTION OF THE DRAWINGS

Accompanying drawings are incorporated into and constitute a part of this specification, show embodiments that conform to this application, and are used together with this specification to describe the principle of this application.

DETAILED DESCRIPTION

Figure 1:
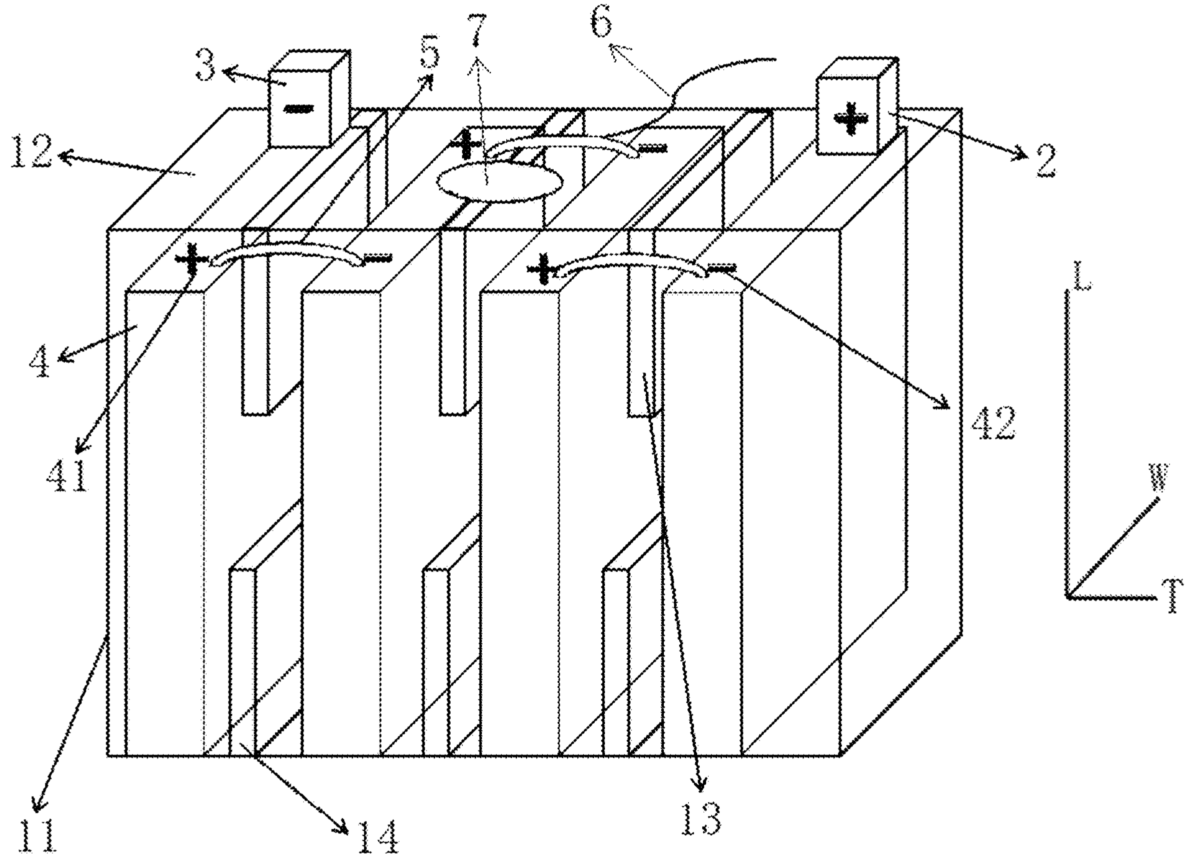
FIG. 1 is a schematic structural perspective view of a first embodiment of a battery according to the disclosure.

Various embodiments of this application are now be described in detail with reference to the accompanying drawings. It is to be noted that, unless otherwise specified, corresponding arrangement, numerical expressions, and numerical values of components and steps described in the embodiments do not limit the scope of the disclosure.

The following descriptions of at least one embodiment are merely illustrative, and in no way constitute any limitation on this application and application or use of this application.

Technologies, methods, and devices known to those of ordinary skill in related arts may not be discussed in detail, but where appropriate, the techniques, the methods, and the devices should be considered as a part of the specification.

In all examples shown and discussed herein, any specific value should be construed as merely exemplary and not as limitations. Therefore, other examples of embodiments may have different values.

It is to be noted that, similar reference signs or letters in the accompanying drawings indicate similar items. Therefore, once an item is defined in one accompanying drawing, the item does not need to be further discussed in the subsequent accompanying drawings.

An embodiment of the disclosure provides a battery. The battery includes: a housing, at least two electrode core sets, and separators. The housing has an accommodating cavity therein. The at least two electrode core sets are arranged in the accommodating cavity along a first direction. The first direction is an arrangement direction of the electrode core sets. The electrode core sets are connected in series with each other. Each electrode core set includes at least one electrode core. The separators each are arranged between two adjacent electrode core sets and configured to prevent the two adjacent electrode core sets from coming into contact with each other. That is to say, after the separator is arranged, it can be ensured that the two adjacent electrode core sets do not come into contact with each other.

The separator includes a first separator 13 and a second separator 14. The first separator 13 and the second separator 14 are arranged opposite to each other along a second direction. A gap is provided between the first separator 13 and the second separator 14 in the second direction. The second direction is perpendicular to the first direction. The first separator 13 and the second separator 14 may have a same shape or different shapes.

Opposite arrangement may be understood as that positions of the first separator 13 and the second separator 14 may be slightly misaligned. The first direction may be understood as an arrangement direction of the electrode core sets. For example, the first direction may be a thickness direction of the electrode core sets, that is, a T direction shown in FIG. 1 and FIG. 3. In this case, the second direction is a length direction of the electrode core sets, that is, an L direction shown in FIG. 1 and FIG. 3. In an embodiment, the second direction is a width direction of the electrode core sets, that is, a W direction shown in FIG. 1 and FIG. 3.

According to the battery provided in this embodiment of the disclosure, the at least two electrode core sets are connected in series in the accommodating cavity of the housing, that is to say, the at least two electrode core sets share the housing. Compared with a side-by-side arrangement of multiple cells, in this embodiment of the disclosure, outer housings and external mounting structures are reduced, thereby reducing a weight, improving space utilization, and ensuring an overall capacity of the power battery pack. In addition, use of an external power connection component is reduced. The adjacent electrode core sets inside the housing are directly connected in series, without a need to consider connecting stability and reliability of the power connection component. In this way, connection content can be reduced, thereby reducing internal consumption of the power battery pack during use. However, in a case that the electrode core sets are directly connected in series inside the housing, if the electrode core sets come into contact with each other when the battery is squeezed, shaken, or collided during the use, a short circuit is very likely to occur, resulting in a battery failure risk, or even certain safety hazards.

Therefore, according to the battery provided in this embodiment of the disclosure, the separator is arranged between the two adjacent electrode core sets, and the separator is configured to prevent the two adjacent electrode core sets from coming into contact with each other. That is to say, the separator can effectively prevent the two adjacent electrode core sets from coming into contact with each other. Even if the battery is squeezed or collided, by means of the isolation of the separator, the electrode core sets do not collide or come into contact with each other, thereby ensuring use reliability and safety of the battery. In addition, the separator can further provide support in the housing, so that an ability of the battery to resist external forces is enhanced.

In addition, since the separator includes the first separator 13 and the second separator 14, and the gap is formed between the first separator 13 and the second separator 14, convenient mounting is achieved. Compared with the arrangement of a single complete separator, the weight of the battery can be effectively reduced, thereby facilitating lightweight design of the battery and reducing costs.

Figure 3:
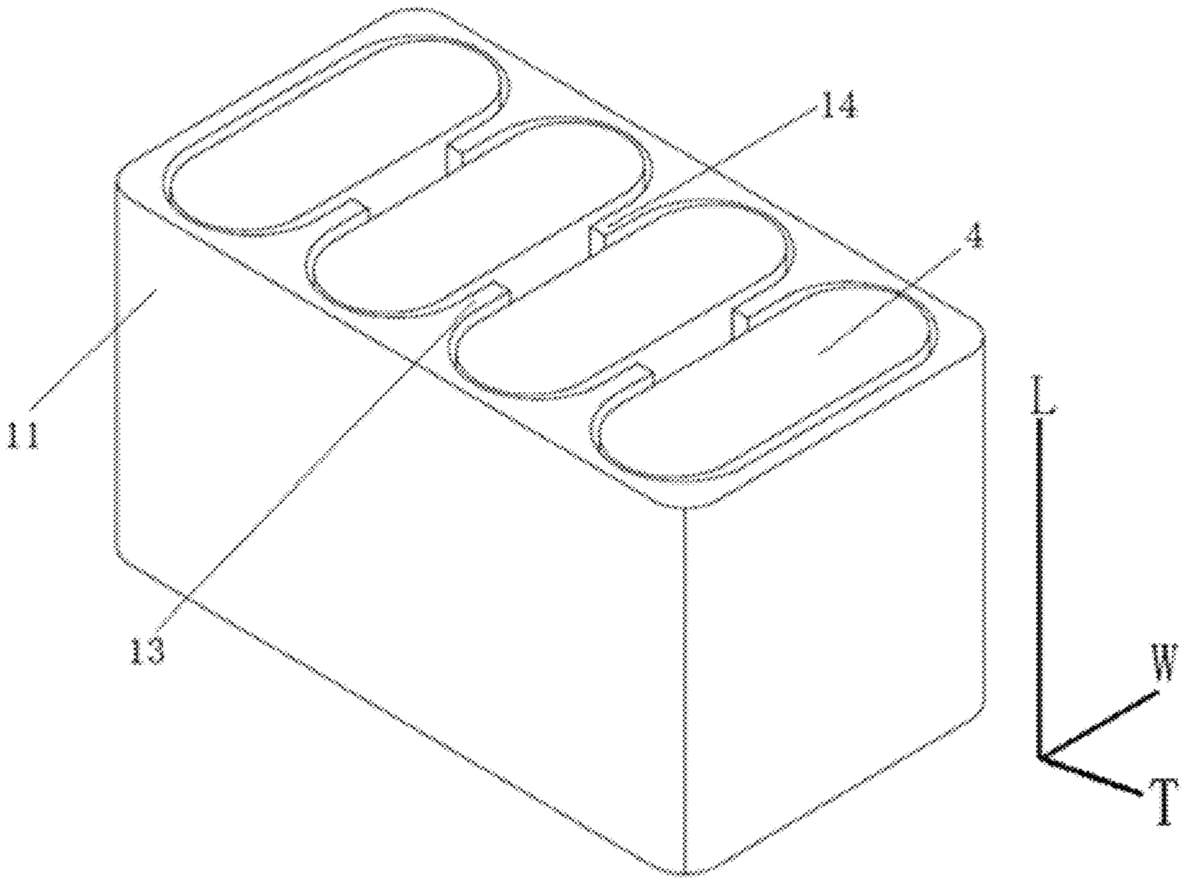
FIG. 3 is a schematic structural perspective view of another embodiment of the battery according to the disclosure.

Referring to FIG. 1, the first separator 13 and the second separator 14 are arranged opposite to each other along the second direction. The second direction is the length direction of the electrode core sets, that is, the L direction in FIG. 1. Referring to FIG. 3, the first separator 13 and the second separator 14 are arranged opposite to each other along the second direction. The second direction is the width direction of the electrode core sets, that is, the W direction in FIG. 3. In both of the two implementations, not only it can be ensured that the separator effectively isolates the two adjacent electrode core sets, but also the weight can be reduced.

In the battery provided in this embodiment of the disclosure, referring to FIG. 1, the electrode core set may include only a single electrode core 4, or the electrode core set may include at least two electrode cores 4. The at least two electrode cores 4 may be connected in series and/or in parallel to form the electrode core set. This is not limited in the disclosure. For example, two electrode cores 4 are connected in parallel to form the electrode core set. In an embodiment, four electrode cores 4 are connected in parallel to form the electrode core set. The electrode core 4 is a frequently used electrode core in the field of power batteries. The electrode core 4 may be formed by winding or lamination. Generally, the electrode core 4 includes at least a positive plate, a diaphragm, a negative plate, and a solid electrolyte.

In the battery provided in this embodiment of the disclosure, the electrolyte is a solid electrolyte or a polymer electrolyte. That is to say, in the battery provided in this embodiment of the disclosure, the electrolyte used in the electrode core 4 is not a liquid electrolyte.

According to the battery provided in some embodiments of the disclosure, the battery is a polymer lithium-ion battery. Generally, the electrode core 4 includes the positive plate, the negative plate, a diaphragm, and the electrolyte. In this case, in the polymer lithium-ion battery, the electrolyte is the polymer electrolyte. The battery may be classified into a liquid lithium-ion battery and the polymer lithium-ion battery in terms of a material of the electrolyte arranged in the battery. The liquid lithium-ion battery uses the liquid electrolyte, and the polymer lithium-ion battery uses the polymer electrolyte. The polymer is generally colloidal rather than liquid.

In some other embodiments of the disclosure, the battery is a solid-state battery. Generally, the electrode core 4 includes the positive plate, the negative plate, and the solid electrolyte. In the solid-state battery, the electrolyte uses the solid electrolyte that is also not liquid.

In the disclosure, one of reasons why the gap may be formed between the first separator 13 and the second separator 14 is that the polymer battery or the solid-state battery is used. That is to say, in the battery provided in the disclosure, the electrolyte is the polymer electrolyte or the solid electrolyte. When the battery is the polymer battery or the solid-state battery, the electrolyte is the polymer electrolyte or the solid electrolyte. The electrolyte can be stably located between the positive plate and the negative plate, and does not flow out from the positions of the positive plate and the negative plate like an electrolyte solution.

Figure 2:
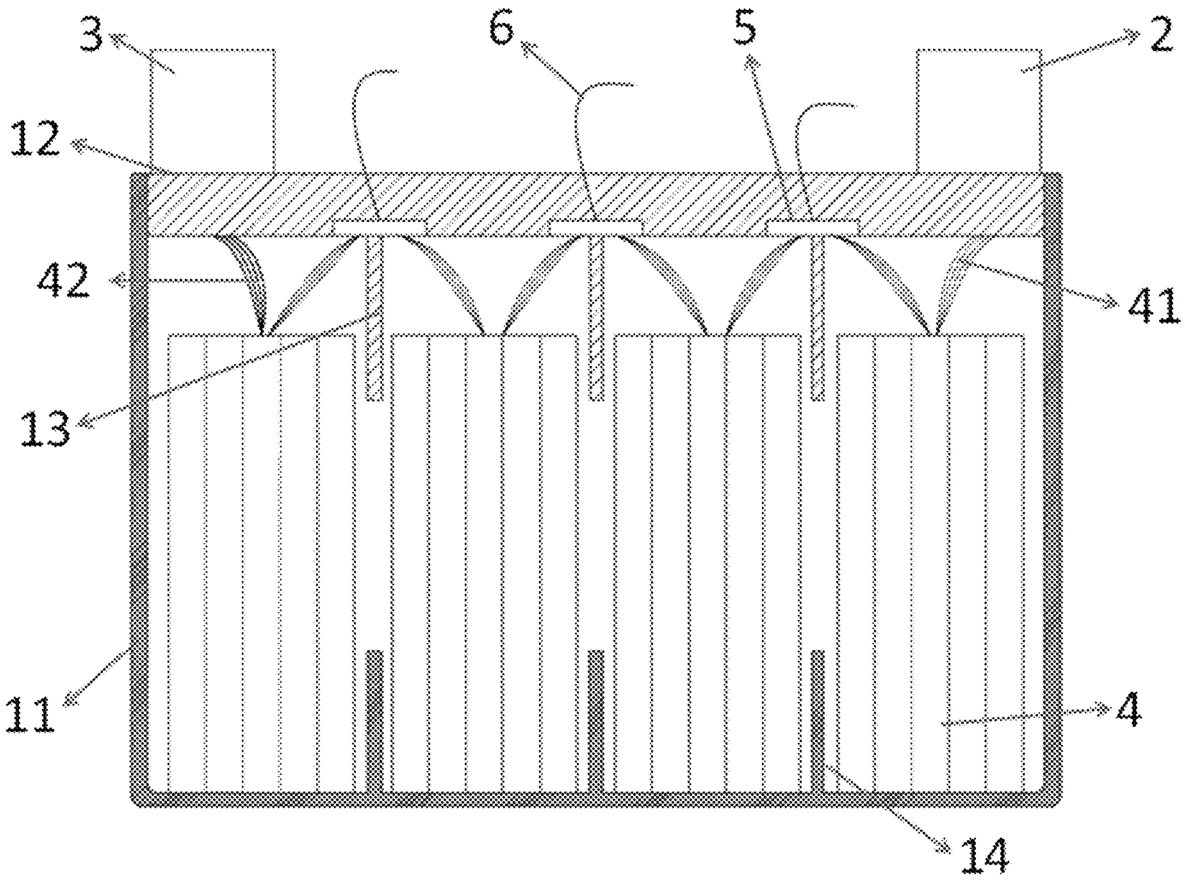
FIG. 2 is a schematic structural cross-sectional view of the first embodiment of the battery according to the disclosure.

In the embodiment shown in FIG. 1 and FIG. 2, two ends of the electrode core set along the length direction both span the gap between the first separator 13 and the second separator 14. The reason why the two ends of the electrode core set along the length direction are both designed to span the gap between the first separator 13 and the second separator 14 is to ensure effective isolation of the first separator 13 and the second separator 14 between the two adjacent electrode core sets, thereby preventing end portions of the two adjacent electrode core sets from coming into contact and colliding with each other at the gap between the first separator 13 and the second separator 14. The length direction is the L direction.

The first separator 13 and the second separator 14 are fixedly connected with an inner surface of the housing. Specifically, in the embodiment shown in FIG. 1 and FIG. 2, the first separator 13 and the second separator 14 are arranged along the length direction (that is, the L direction) of the electrode core sets, and the gap is formed between the first separator 13 and the second separator 14 along the length direction of the electrode core sets. That is to say, the first separator 13 and the second separator 14 are not connected with each other. In this embodiment, the first separator 13 and the second separator 14 are respectively fixedly connected with two surfaces of the housing along the L direction. In this way, the first separator 13 and the second separator 14 can be conveniently positioned and mounted, and dislocation of the separators during assembling is prevented.

Figure 4:
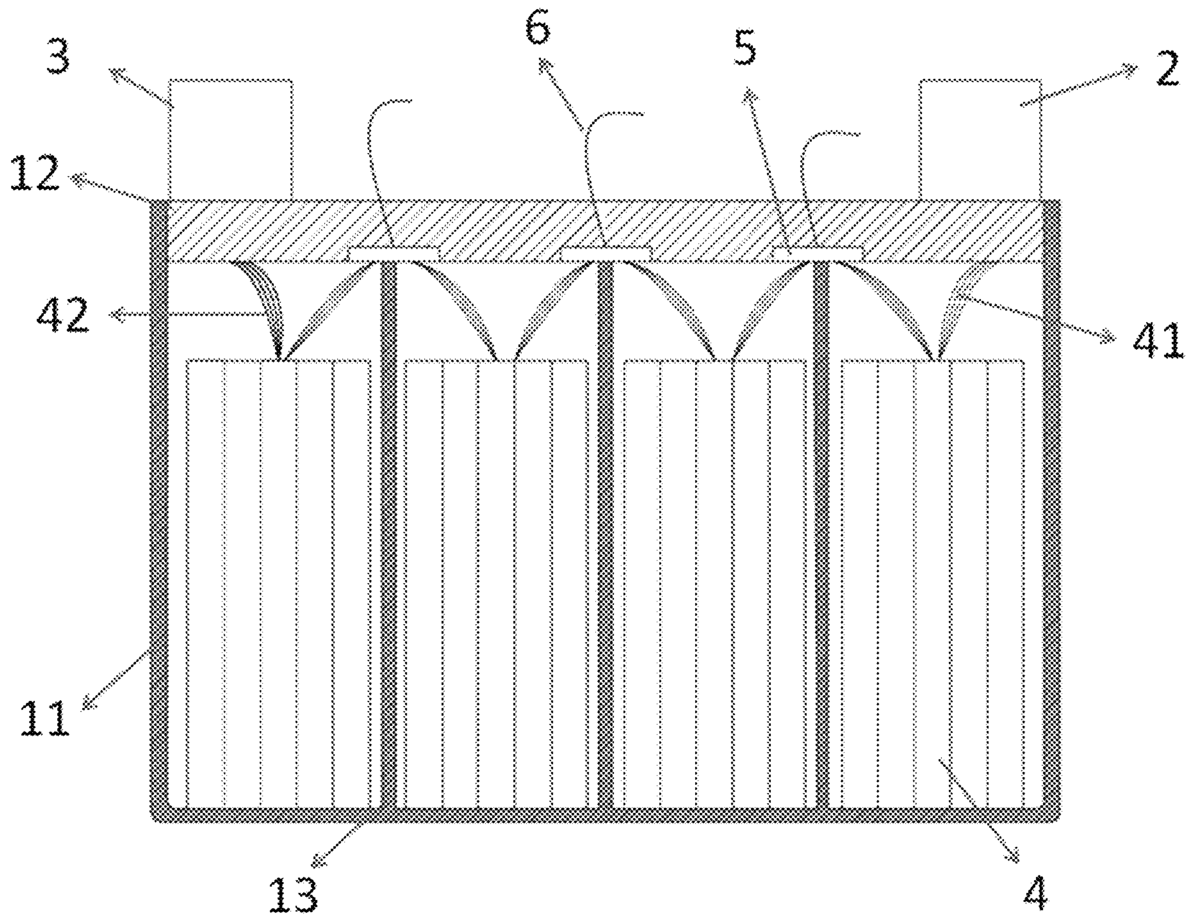
FIG. 4 is a schematic structural cross-sectional view of the another embodiment of the battery according to the disclosure.

Referring to FIG. 3 and FIG. 4, in another embodiment, the first separator 13 and the second separator 14 are arranged along the width direction (that is, the W direction) of the electrode core sets. The gap is formed between the first separator 13 and the second separator 14 along the width direction of the electrode core sets. That is to say, the first separator 13 and the second separator 14 are not connected with each other. Two ends of the electrode core set along the width direction both span the gap between the first separator 13 and the second separator 14. The reason why the two ends of the electrode core set along the width direction are both designed to span the gap between the first separator 13 and the second separator 14 is to ensure effective isolation of the first separator 13 and the second separator 14 between the two adjacent electrode core sets, thereby preventing end portions of the two adjacent electrode core sets from coming into contact and colliding with each other at the gap between the first separator 13 and the second separator 14. In this embodiment, the first separator 13 and the second separator 14 are respectively fixedly connected with two surfaces of the housing along the W direction.

In the description of the disclosure, it is to be understood that orientation or position relationships indicated by the terms such as "length direction", "width direction", and "thickness direction" are based on orientation or position relationships shown in the drawings, and are merely used for facilitating description of the disclosure and simplifying the description, rather than indicating or implying that the mentioned apparatuses or elements need to have a particular orientation or need to be constructed and operated in a particular orientation. Therefore, the terms should not be understood as a limitation on the disclosure.

Figure 5:
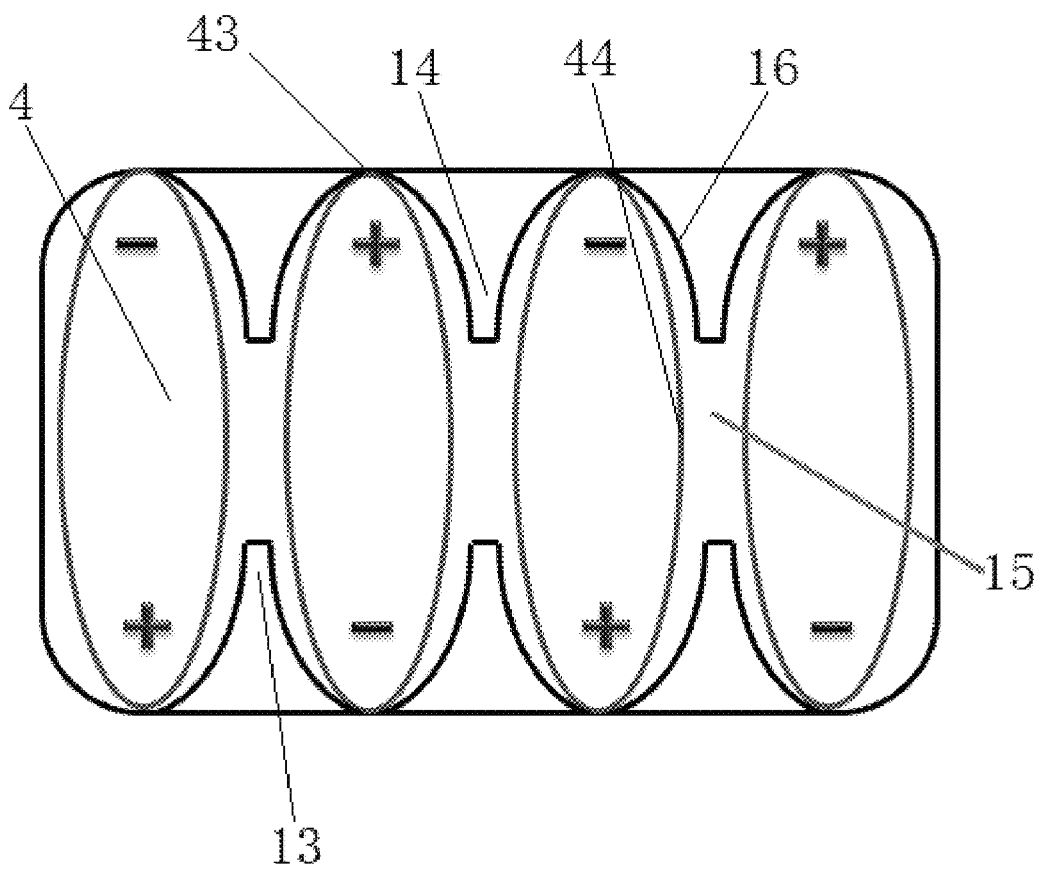
FIG. 5 is a status diagram of the battery before charging.
Figure 6:
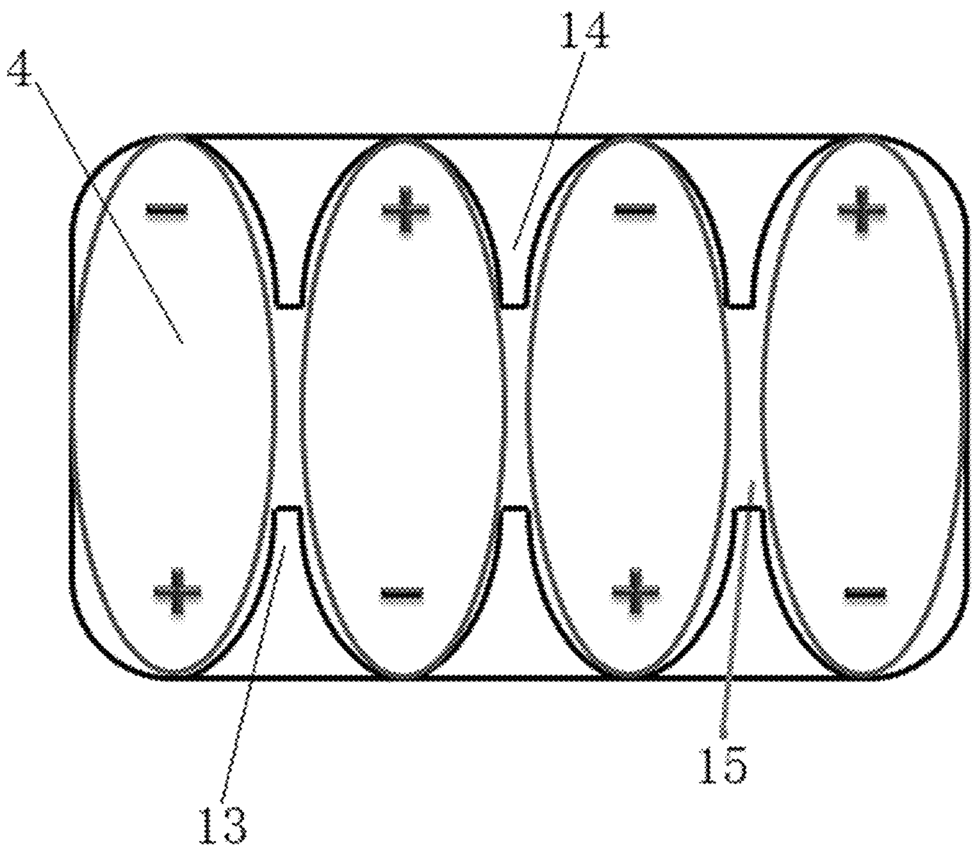
FIG. 6 is a status diagram of the battery that is fully charged.

Referring to FIG. 5 and FIG. 6, an expansion space is reserved between the electrode core set and the separator. FIG. 5 shows a status of the battery before charging. At this time, a volume of the electrode core set is relatively small, and the expansion space 15 is relatively large. FIG. 6 shows a status of the battery that is fully charged. At this time, the volume of the electrode core set is larger, a part of the expansion space 15 is occupied, and therefore the expansion space 15 is smaller. The expansion space 15 can prevent the electrode core sets from squeezing each other and thereby causing an internal short circuit, so that the use safety of the battery can be enhanced.

Referring to FIG. 5 and FIG. 6, the first separator 13 and the second separator 14 each include separator side surface 16 facing the electrode core sets. A distance between the separator side surface 16 of the first separator 13 and/or the second separator 14 and the electrode core set shows an increasing trend in a direction from outside to inside of the housing. The distance between the separator side surface 16 and the electrode core set may show an increasing trend in the direction from outside to inside of the housing. Preferably, the increasing trend is a gradual increase.

More preferably, the distances between the two separator side surfaces 16 of each first separator 13 and/or second separator 14 and the electrode core sets both gradually increase in the direction from outside to inside of the housing. The gradually increasing distance ensures that the expansion space can more effectively prevent the electrode core sets from squeezing each other as a result of increased volumes of the electrode core sets after charging.

Referring to FIG. 5 and FIG. 6, in an embodiment, the first separator 13 and the second separator 14 each include two separator side surfaces 16 facing the electrode core set. The two separator side surfaces 16 are cambered surfaces. Further, the electrode core set includes a circumferential surface 43 facing the housing and an electrode core set lateral surface 44 facing the separator. An area of the electrode core set lateral surface 44 is greater than an area of the circumferential surface 43. Since the electrode core set lateral surface 44 having a larger area expands more greatly than the circumferential surface 43, a larger expansion space is required to be reserved at a position of the electrode core set lateral surface 44.

By designing the cambered surfaces in the first separator 13 and the second separator 14, sufficient expansion space is ensured, the electrode core sets are prevented from coming into contact with each other, and positions of the electrode core sets are defined, so that the use safety of the battery can be ensured.

In an implementation in which multiple first separators 13 are arranged, the multiple first separators 13 may be integrally formed. Further, the multiple first separators are integrally formed with the housing.

In an implementation in which multiple second separators 14 are arranged, the multiple second separators 14 are integrally formed. Further, the multiple second separators are integrally formed with the housing.

In an embodiment, the first separator 13 and the second separator 14 are plate-shaped or mesh-shaped. Referring to FIG. 1, the first separator 13 and the second separator 14 are plate-shaped structures. The first separator 13 and the second separator 14 having the plate-shaped structures can not only isolate the electrode core sets, but also provide excellent support for the battery, so that the ability of the battery to resist external forces can be effectively enhanced. Definitely, the first separator 13 and the second separator 14 may alternatively be designed as mesh-shaped structures. The first separator 13 and the second separator 14 having the mesh-shaped structures can still effectively isolate the electrode core sets. In addition, by means of the first separator 13 and the second separator 14 having the mesh-shaped structures, the weight of the battery can be reduced more effectively.

In an embodiment, the separator is made of an insulation material. The separator made of the insulation material can more effectively prevent a short circuit from occurring between the electrode core sets. Even if the two adjacent electrode core sets and the separator are squeezed together when the battery is under the action of a strong force, since the separator is made of the insulation material, the short circuit does not occur between the electrode core sets.

In an embodiment, an insulation film is arranged between the electrode core set and the housing. A material of the insulation film is not specially limited in the disclosure, as long as insulation can be achieved. In some embodiments, a material of the isolation film may include polypropylene (PP), polyethylene (PE), or a multi-layer composite film.

In an embodiment, referring to FIG. 1, the housing includes a housing body 11 having an end portion with an opening and a cover plate 12 arranged at the opening of the housing body 11. The cover plate 12 and the housing body 11 are connected and sealed together to define an accommodating cavity. The electrode core set is located in the accommodating cavity. The housing includes the housing body 11 having the end portion with the opening and the cover plate 12, so that the electrode core sets and the separators in the housing can be conveniently assembled. In an embodiment, the cover plate 12 and the housing body 11 are made of a same material, which are both made of a metal material or a plastic material. In an embodiment, the housing body 11 is an integrally formed structure, and the cover plate 12 is also an integrally formed structure.

In the embodiment shown in FIG. 1 and FIG. 2, the first separator 13 is integrally formed with the cover plate 12, and/or the second separator 14 is integrally formed with the housing body 11. That is to say, the first separator 13 is integrally formed with the cover plate 12, or the second separator 14 is integrally formed with the housing body 11. In an embodiment, the first separator 13 is integrally formed with the cover plate 12, and the second separator 14 is integrally formed with the housing body 11. In the embodiment in which the first separator 13 is integrally formed with the cover plate 12, the first separator 13 is integrally formed with the cover plate 12 by aluminum casting or injection molding. In the embodiment in which the second separator 14 is integrally formed with the housing body 11, the second separator 14 is integrally formed with the housing body 11 by aluminum casting or injection molding. In the embodiment in which the first separator 13 is integrally formed with the cover plate 12 and the second separator 14 is integrally formed with the housing body 11, the first separator 13 is integrally formed with the cover plate 12 by aluminum casting or injection molding, and the second separator 14 is integrally formed with the housing body 11 by aluminum casting or injection molding. The integral formation facilitates machining and manufacturing, and can ensure firmness and reliability of the connection between the first separator 13 and the cover plate 12 and between the second separator 14 and the housing body 11.

In the embodiment shown in FIG. 3 and FIG. 4, the first separator 13 and/or the second separator 14 are/is integrally formed with the housing body 11. That is to say, the first separator 13 is integrally formed with the housing body 11, or the second separator 14 is integrally formed with the housing body 11, or the first separator 13 and the second separator 14 are both integrally formed with the housing body 11. In the embodiment in which the first separator 13 is integrally formed with the housing body 11, the first separator 13 is integrally formed with the housing body 11 are integrally formed by aluminum casting or injection molding. In the embodiment in which the second separator 14 is integrally formed with the housing body 11, the second separator 14 is integrally formed with the housing body 11 by through aluminum casting or injection molding. In the embodiment in which the first separator 13 and the second separator 14 are both integrally formed with the housing body 11, the first separator 13 and the second separator 14 are both integrally formed with the housing body 11 by aluminum casting or injection molding.

In an embodiment, referring to FIG. 1 and FIG. 2, in the embodiment in which the housing includes the housing body 11 and the cover plate 12, a positive pole 2 and a negative pole 3 are arranged on the cover plate 12. Each electrode core set has a current lead-out member. In the embodiment shown in FIG. 1, the at least two electrode core sets are arranged in a line. The positive pole 2 on the housing is connected with the current lead-out member of one of two outermost electrode core sets. The negative pole 3 on the housing is connected with the current lead-out member of another one of the two outermost electrode core sets. In a case that the electrode core set only includes one electrode core 4, the current lead-out member of the electrode core set is a positive tab 41 and a negative tab 42 of the electrode core 4. The positive pole 2 on the housing is connected with the positive tab 41 of one of the two outermost electrode core sets. The negative pole 3 on the housing is connected with the negative tab 42 of the other one of the two outermost electrode core sets. In a case that the electrode core set includes multiple electrode cores 4 connected in parallel, the positive tabs 41 of the multiple electrode cores 4 are connected to form a positive lead, and the negative tabs 42 of the multiple electrode cores 4 are connected to form a negative lead. In this case, the current lead-out member is the positive lead and the negative lead. The positive pole 2 on the housing is connected with the positive lead of one of the two outermost electrode core sets. The negative pole 3 on the housing is connected with the negative lead of the other of the two outermost electrode core sets.

In an embodiment, referring to FIG. 1 and FIG. 2, grooves are formed on the cover plate 12. Conductive connection components 5 are embedded in the grooves. Specifically, the grooves are provided on a lower surface of the cover plate 12 facing the housing body 11. The conductive connection components 5 are configured to connect the multiple electrode core sets in series. Specifically, the conductive connection components 5 are fixedly arranged in the grooves, to prevent the conductive connection components 5 from shaking or displacing during the use of the battery and thereby affecting reliability of connecting the electrode core sets in series by the conductive connection components 5 to. In a case that each electrode core set includes only one electrode core 4, as shown in FIG. 1, the positive tab 41 of one of the two adjacent electrode core sets is connected with one end of each conductive connection component 5, and the negative tab 42 of another one of the electrode core sets is connected with another end of the conductive connection component 5.

In an embodiment, the conductive connection component 5 is integrally formed with the cover plate 12. By means of the integral formation, the connection between the conductive connection component 5 and the cover plate 12 becomes firmer and stabler. In an implementation in which each electrode core set includes only one electrode core 4, as shown in FIG. 1, after a hot pressing process, the positive tab 41 and the negative tab 42 of the electrode core 4 are connected with the conductive connection component 5 on the cover plate 12 by soldering or riveting. Then the electrode core 4 and the cover plate 12 are placed into the housing body 11 through the open end of the housing body 11. The cover plate 12 covers the opening of the housing body 11. Finally, a periphery of the cover plate 12 is soldered to the housing body 11 for sealing, thereby completing the assembling.

In an embodiment, the conductive connection component 5 includes a copper connection piece and an aluminum connection piece. The copper connection piece is electrically connected with the aluminum connection piece. A position where the copper connection piece is electrically connected with the aluminum connection piece is located in the cover plate 12. In an embodiment, the copper connection piece is first brought into composite connection with the aluminum connection piece to form a composite connection piece. Then the copper connection piece is connected with a copper lead-out terminal of the electrode core set on one side of the separator, and the aluminum connection piece is connected with an aluminum lead-out terminal of the electrode core set on another side of the separator.

In an embodiment, the battery further includes a detection circuit. The detection circuit is electrically connected with the electrode core set and is configured to detect a status of the electrode core set. The status of the electrode core set is generally a signal such as a temperature signal and a voltage signal of each electrode core set.

In an embodiment, referring to FIG. 1, the detection circuit comprises a sampling line 6. The sampling line 6 is connected with the conductive connection component 5. In order to accurately collect signals in the battery in real time, one sampling line 6 is connected with each conductive connection component 5. The sampling line 6 is led out of the battery above the cover plate 12, to accurately record the temperature signal and the voltage signal of each electrode core set.

In an embodiment, an insulation layer is arranged between the conductive connection component 5 and the cover plate 12. Since the conductive connection component 5 is made of a metal composite material including copper and aluminum, when the cover plate 12 is made of a metal material, the insulation layer is required to be arranged between the conductive connection component 5 and the cover plate 12, to avoid electric conduction of the cover plate and a short circuit or a safety event. In an embodiment, the insulation layer is made of plastic cement or plastic. Definitely, the insulation layer may be made of other insulation materials. This is not specially limited in the disclosure.

In an embodiment, the battery is a polymer lithium-ion battery. The battery may be classified into a liquid lithium-ion battery and the polymer lithium-ion battery in terms of a material of the electrolyte arranged in the battery. The liquid lithium-ion battery uses the liquid electrolyte, and the polymer lithium-ion battery uses the solid polymer electrolyte. The polymer may be dry or colloidal. Even if the first separator 13 and the second separator 14 in the disclosure do not completely isolate the two adjacent electrode core sets, since the solid polymer electrolyte does not flow between the two adjacent electrode core sets, decomposition of the polymer electrolyte caused by a potential difference does not occur. Therefore, in the solution of the disclosure, the battery is preferably the polymer lithium-ion battery.

Figure 7:
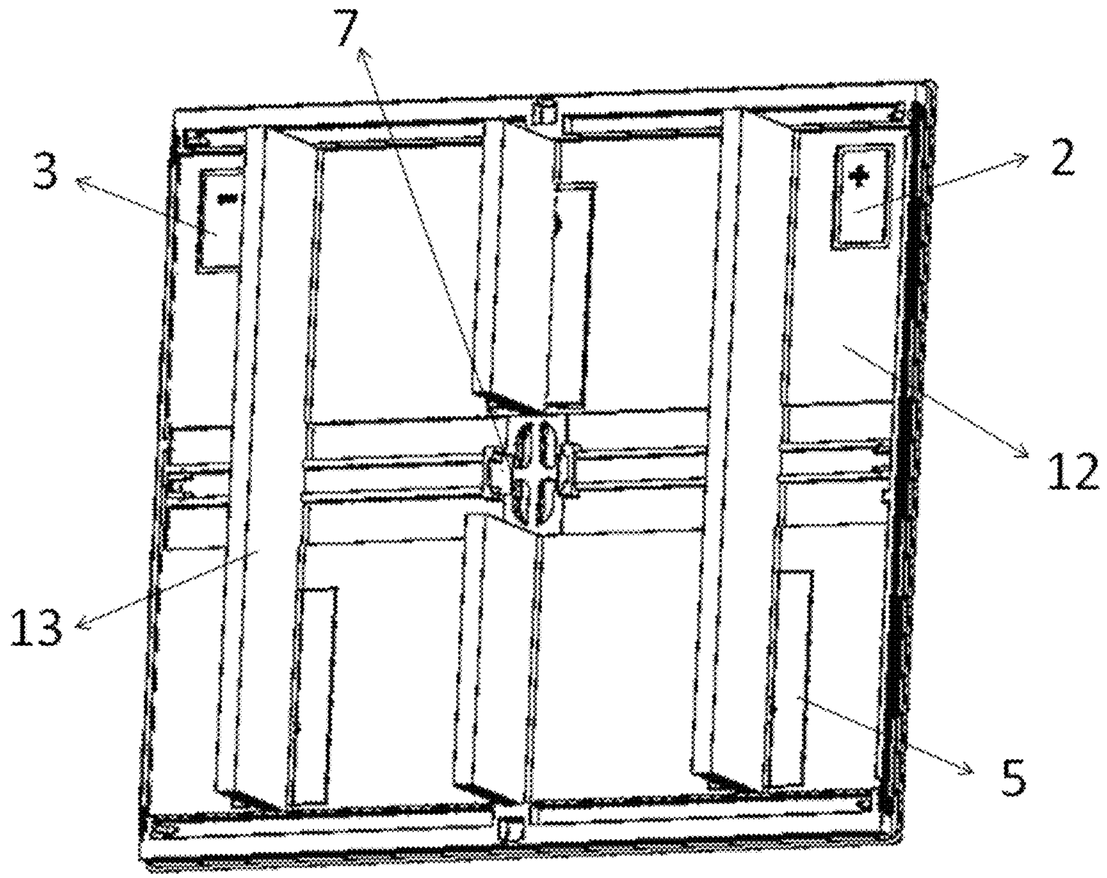
FIG. 7 is a schematic diagram of a cover plate of the first embodiment of the battery according to the disclosure.

In an embodiment, referring to FIG. 7, an explosion-proof valve 7 is arranged on the cover plate 12. The explosion-proof valve 7 is configured to be opened to release pressure when a pressure value in the battery exceeds a pressure threshold. By means of the explosion-proof valve 7, safety of the use of the battery can be ensured. When a pressure value in the battery exceeds a safe pressure threshold, the explosion-proof valve 7 can be automatically opened to release the pressure in the battery, so that a risk of explosion due to an excessively large internal pressure of the battery can be effectively prevented.

An embodiment of the disclosure further provides a battery module. The battery module includes at least two batteries described above. The at least two batteries in the battery module may be connected in series and/or in parallel. A detection sampling component may be arranged on the battery module, and is configured to independently supply power to the battery module.

An embodiment of the disclosure further provides a battery pack. The battery pack includes at least two batteries described above or at least two battery modules described above. The at least two batteries or the at least two battery modules in the battery pack may be connected in series and/or in parallel. A detection sampling component may be arranged on the battery pack, and is configured to independently supply power to the battery pack.

An embodiment of the disclosure further provides an electric vehicle. The electric vehicle includes the battery module described above or the battery pack described above. The battery module or the battery pack both can independently supply power to the electric vehicle.

Although some specific embodiments of this application have been described in detail by way of examples, a person skilled in the art should understand that the foregoing examples are only for description and are not intended to limit the scope of this application. A person skilled in the art should appreciate that modifications may be made to the foregoing embodiments without departing from the scope and spirit of this application. The scope of this application is limited only by the appended claims.

What is claimed is:

1. A battery, comprising:

a housing, having an accommodating cavity therein and a cover plate;

at least two electrode core sets, arranged in the accommodating cavity along a first direction and connected in series with each other, wherein each electrode core set comprises at least one electrode core, and wherein the at least one electrode core comprises a positive plate, a diaphragm, a negative plate, and a polymer or solid electrolyte, and wherein each electrode core set comprises a circumferential surface facing the housing and an electrode core set lateral surface facing the separators, an area of the electrode core set lateral surface being greater than an area of the circumferential surface; and separators, arranged between two adjacent electrode core sets, configured to prevent the two adjacent electrode core sets from contacting with each other, and comprising a first separator and a second separator, wherein an expansion space is arranged between each of the separators and the two adjacent electrode core sets, the first separator and the second separator are arranged opposite to each other along a second direction, a gap is provided between the first separator and the second separator along the second direction, and the second direction is perpendicular to a surface of the cover plate, and wherein each of the first separator and the second separator comprises two separator side surfaces facing the two adjacent electrode core sets, and the two separator side surfaces are concave cambered surfaces recessed away from the two adjacent electrode core sets to provide the expansion space, wherein a distance between each of the two separator side surfaces and the adjacent electrode core set gradually increases in a direction from outside to inside of the housing, the distance being smallest adjacent the housing.

2. The battery according to claim 1, wherein the first separator and the second separator are fixedly connected with an inner surface of the housing.

3. The battery according to claim 2, wherein one or more of the first separator and the second separator are integrally formed with the housing.

4. The battery according to claim 1, wherein the first separator and the second separator are plate-shaped or mesh-shaped.

5. The battery according to claim 1, wherein two ends of each of the at least two electrode core sets opposite to each other along the second direction span the gap between the first separator and the second separator.

6. The battery according to claim 1, wherein the expansion space has a thickness between the electrode core set and the separator.

7. The battery according to claim 6, wherein the thickness of the expansion space monotonically increases in a direction from outside to inside of the housing.

8. The battery according to claim 1, wherein the separators are made of an insulation material.

9. The battery according to claim 1, wherein an insulation film is arranged between the at least two electrode core sets and the housing.

10. The battery according to claim 1, wherein the housing comprises a housing body having an end portion with an opening and the cover plate arranged at the opening of the housing body.

11. The battery according to claim 10, wherein grooves are provided on the cover plate;

conductive connection components are embedded in the grooves; and the conductive connection components are configured to connect the two adjacent electrode core sets in series.

12. The battery according to claim 11, wherein the conductive connection components are integrally formed with the cover plate.

13. The battery according to claim 11, wherein each of the conductive connection components comprises a copper connection piece and an aluminum connection piece; and a position where the copper connection piece is electrically connected with the aluminum connection piece is located in the cover plate.

14. The battery according to claim 11, wherein an insulation layer is arranged between the conductive connection components and the cover plate.

15. The battery according to claim 11, further comprising a detection circuit that is electrically connected with the at least two electrode core sets and configured to detect a status of the at least two electrode core sets.

16. The battery according to claim 15, wherein the detection circuit comprises a sampling wire; and the sampling wire is connected with the conductive connection components.

17. The battery according to claim 1, wherein the battery comprises a polymer lithium-ion battery or a solid-state battery.

18. A battery pack, comprising a battery, wherein the battery comprises:

a housing, having an accommodating cavity therein and a cover plate;

at least two electrode core sets, arranged in the accommodating cavity along a first direction and connected in series with each other, wherein each electrode core set comprises at least one electrode core, and wherein the at least one electrode core comprises a positive plate, a diaphragm, a negative plate, and a polymer or solid electrolyte, and wherein each electrode core set comprises a circumferential surface facing the housing and an electrode core set lateral surface facing the separators, an area of the electrode core set lateral surface being greater than an area of the circumferential surface; and separators, arranged between two adjacent electrode core sets, configured to prevent the two adjacent electrode core sets from contacting with each other, and comprising a first separator and a second separator, wherein an expansion space is arranged between each of the separators and the two adjacent electrode core sets, the first separator and the second separator are arranged opposite to each other along a second direction, a gap is provided between the first separator and the second separator along the second direction, and the second direction is perpendicular to a surface of the cover plate, and wherein each of the first separator and the second separator comprises two separator side surfaces facing the two adjacent electrode core sets, and the two separator side surfaces are concave cambered surfaces recessed away from the two adjacent electrode core sets to provide the expansion space, wherein a distance between each of the two separator side surfaces and the adjacent electrode core set gradually increases in a direction from outside to inside of the housing, the distance being smallest adjacent the housing.

19. An electric vehicle, comprising a battery pack, wherein the battery pack comprises a battery, and the battery comprises:

a housing, having an accommodating cavity therein and a cover plate;

at least two electrode core sets, arranged in the accommodating cavity along a first direction and connected in series with each other, wherein each electrode core set comprises at least one electrode core, and wherein the at least one electrode core comprises a positive plate, a diaphragm, a negative plate, and a polymer or solid electrolyte, and wherein each electrode core set comprises a circumferential surface facing the housing and an electrode core set lateral surface facing the separators, an area of the electrode core set lateral surface being greater than an area of the circumferential surface; and separators, arranged between two adjacent electrode core sets, configured to prevent the two adjacent electrode core sets from contacting with each other, and comprising a first separator and a second separator, wherein an expansion space is arranged between each of the separators and the two adjacent electrode core sets, the first separator and the second separator are arranged opposite to each other along a second direction, a gap is provided between the first separator and the second separator along the second direction, and the second direction is perpendicular to a surface of the cover plate, and wherein each of the first separator and the second separator comprises two separator side surfaces facing the two adjacent electrode core sets, and the two separator side surfaces are concave cambered surfaces recessed away from the two adjacent electrode core sets to provide the expansion space, wherein a distance between each of the two separator side surfaces and the adjacent electrode core set gradually increases in a direction from outside to inside of the housing, the distance being smallest adjacent the housing.

* * * * *